United States Patent
Sun et al.

(10) Patent No.: US 9,080,096 B2
(45) Date of Patent: Jul. 14, 2015

(54) OIL DISPLACEMENT AGENT AND PROCESS FOR PREPARING THE SAME

(75) Inventors: Huanquan Sun, Dongying (CN); Zhenquan Li, Dongying (CN); Xulong Cao, Dongying (CN); Guangsu Huang, Chengdu (CN); Xinwang Song, Dongying (CN); Xiaohong Cui, Dongying (CN); Kun Liu, Dongying (CN); Jing Zheng, Chengdu (CN); Xiaoyan Chen, Dongying (CN); Zhiqing Su, Chengdu (CN); Zuming Jiang, Chengdu (CN); Jinrong Wu, Chengdu (CN)

(73) Assignees: GEOSCIENCE RESEARCH INSTITUTE OF SHENGLI OILFIELD BRANCH, SINOPEC GEOSCIENCE RESEARCH INSTITUTE, Dongying (CN); SICHUAN UNIVERSITY, Chengdu (CN)

( * ) Notice: Subject to any disclaimer, the term of this patent is extended or adjusted under 35 U.S.C. 154(b) by 519 days.

(21) Appl. No.: 13/007,549

(22) Filed: Jan. 14, 2011

(65) Prior Publication Data
US 2011/0178257 A1    Jul. 21, 2011

(51) Int. Cl.
| | |
|---|---|
| *C08F 220/56* | (2006.01) |
| *C08F 218/02* | (2006.01) |
| *C08F 4/40* | (2006.01) |
| *C09K 8/588* | (2006.01) |
| *C02F 101/32* | (2006.01) |
| *C08F 226/02* | (2006.01) |
| *C08F 220/34* | (2006.01) |
| *C10G 1/00* | (2006.01) |

(52) U.S. Cl.
CPC . *C09K 8/588* (2013.01); *C08F 4/40* (2013.01); *C08F 220/56* (2013.01); *C02F 2101/32* (2013.01); *C08F 218/02* (2013.01); *C08F 220/34* (2013.01); *C08F 226/02* (2013.01); *C08F 2218/22* (2013.01); *C10G 1/00* (2013.01)

(58) Field of Classification Search
CPC ................. C08F 220/56; C08F 4/40
See application file for complete search history.

(56) References Cited

U.S. PATENT DOCUMENTS 3,658,772 A * 4/1972 Volk et al. ............... 526/234

FOREIGN PATENT DOCUMENTS

| CN | 1283641 | 2/2001 |
|---|---|---|
| CN | 1405266 | 3/2003 |
| CN | 1796484 | 7/2006 |

OTHER PUBLICATIONS

Wang, Guang-hua et al., "Synthesis of Polyacrylamide in Complex Initiation System Containing Functional Monomer", Guangzhou Huagong 2009, 37(3), 109-111.*

(Continued)

*Primary Examiner* — Richard A Huhn
(74) *Attorney, Agent, or Firm* — Knobbe, Martens, Olson & Bear, LLP

(57) ABSTRACT

The present invention relates to a new type of oil displacement agent and the process for preparing the same. The oil displacement agent is formed of a polyacrylamide-based polymer characterized by a partly crosslinked and partly branched structure, wherein said polyacrylamide-based polymer is obtained by aqueous copolymerization of acrylamide and N,N-dimethylaminoethyl methacrylate as a functional monomer, in the presence of a redox initiator system.

5 Claims, 8 Drawing Sheets

(56) References Cited

OTHER PUBLICATIONS

L. H. Sperling, "Polymer Network Definitions," ACS Division of Polymeric Materials: Science and Engineering (PMSE), 79 (1999).*

Moradi-Araghi, A. et al., The application of gels in enhanced oil recovery: Theory, polymers and crosslinker systems, Proceedings of the National Meeting of the American Chemical Society entitled Polymers in Enhanced Oil Recovery and the Recovery of Other Natural Resources, held Sep. 7-12, 1986, in Anaheim, California.

* cited by examiner

OIL DISPLACEMENT AGENT AND PROCESS FOR PREPARING THE SAME

CROSS-REFERENCE TO RELATED PATENT APPLICATION

This application claims the benefit of Chinese Patent Application Number 201010028113.4 filed on Jan. 18, 2010, the disclosure of which is hereby expressly incorporated by reference in its entirety and hereby expressly made a portion of this application.

TECHNOLOGY FIELD

This invention relates to a field of preparation and application of polymer materials, more specifically, to a novel type of oil displacement agent and a process for preparing the same.

BACKGROUND

Crosslinked polyacrylamide is chiefly used as profile control agents and water shutoff agents in oil recovery technology based on its excellent water absorbability to profile control certain high permeable layers and reform the permeability of the latter.

Chinese patent application No. 200410011395.1 discloses a kind of crosslinked particles poly(acrylic-acrylamide) as profile control agents employing acrylic acid and acrylamide as monomers, and bentonite or kaolin as reinforcing agents.

Moradi-Araghi, A., et al. (Water Soluble Polymers for Petroleum Recovery. Plenum, New York, 299-312.) synthesize poly(vinylpyrrolidone-acrylamide-2-acrylamido-2-methyl-propanesulfonic acid) crosslinked gel as water shutoff agent in harsh environment at a high temperature.

However, crosslinked polyacrylamide cannot be used as oil displacement agent despite its outstanding resistance to heat and salt. That's because the gel is crosslinked completely and the deformability is weak after its expansion in aqueous solution, leading to poor migration in pore throat. Besides, due to its low viscosity and obvious particles sedimentation, it has difficulty in improving mobility ratio of water and oil, that is to say, crosslinked polyacrylamide cannot increase swept volume effectively.

The use of partly hydrolyzed polyacrylamide (HPAM) as oil displacement agent is principally based on its function of increasing the viscosity of aqueous solution to enlarge swept volume and improve mobility ratio.

The larger molecular weight HPAM has, the higher the viscosity of aqueous solution is, and therefore the researchers tend to focus on increasing molecular weight of HPAM.

Chinese patent application No. 00111320.8 discloses the synthesis of anionic polyacrylamide with the molecular weight of 28,000,000~36,000,000, indicating that ultra high molecular weight polyacrylamide is one of current developing trend of oil displacement agent. Another significant development is introducing hydrophobic association structure into linear PAM to increase viscosity of oil displacement agent and to improve its temperature and salt tolerance property.

Chinese patent application No. 02133972.4 discloses a kind of hydrophobic association polyacrylamide synthesized by copolymerization of hydrophobic monomer and acrylamide.

However, linear PAM and its modified polymers are still confronted with severe challenges in practical and those original intentions of molecular design hardly could be achieved. This is because, on the one hand, the high-temperature and high-salinity of underground environment will greatly destroy the single chain of linear polyacrylamide and it's self-assembly structures in aqueous solution. On the other hand, the poor plugging capacity of linear PAM solution to high permeability layer makes it difficult to reform permeability of the heterogeneous formation.

SUMMARY OF THE INVENTION

This invention addresses to the above deficiencies of the prior art, and an aim of the invention is to provide a new type of oil displacement agent and the process for preparing the same.

In one aspect, the oil displacement agent of the present invention is a polyacrylamide-based polymer having a partly crosslinked, partly branched structure, wherein the polyacrylamide-based polymer is produced by aqueous copolymerizing acrylamide and N,N-dimethylaminoethyl methacrylate (DMAEMA) as a functional monomer, in the presence of a redox initiator system.

In the oil displacement agent of the present invention, the mass ratio of acrylamide to DMAEMA is about 100:0.15-1, preferably about 100:0.175-0.5, and more preferably about 100:0.3-0.5. The redox initiator system consists of potassium persulfate and sodium bisulfite, and the amounts of potassium persulfate and sodium bisulfite are about 0.015-0.05 parts of mass and about 0.015-0.05 parts of mass, respectively, relative to 100 parts of mass of acrylamide. The copolymerization of acrylamide and DMAEMA is carried out in an aqueous solution. And the obtained oil displacement agent may present in a form of viscoelastic particle.

In another aspect, the present invention provides a process for preparing the oil displacement agent of the present invention, comprising a step of copolymerizing acrylamide and DMAEMA in an aqueous solution, under an inert gas, in the presence of a redox initiator system.

In the process of the present invention, the mass ratio of acrylamide to DMAEMA is about 100:0.15-1, preferably about 100:0.175-0.5, and more preferably about 100:0.3-0.5. The redox initiator system consists of potassium persulfate and sodium bisulfite, and the amounts of potassium persulfate and sodium bisulfite are about 0.015-0.05 parts of mass and about 0.015-0.05 parts of mass, respectively, relative to 100 parts of mass of acrylamide. The polymerization reaction is carried out at a temperature from 10° C. to 30° C. The inert gas may be nitrogen gas. And, the process may further comprise a step of drying and granulating the polymerization product.

Specific conditions and steps are as following (amounts are in weight parts or weight percentages unless otherwise indicated):

100 portions acrylamide, 0.175~0.5 portions DMAEMA and 0.015~0.05 portions sodium bisulfite are dissolved respectively in 150~180, 20~40, 30~50 portions deionized water. Then they are successively added to a polymerizer equipped with a thermosopic bar, a nitrogen gas inlet/outlet and a jacket by which reaction temperature of 10~30° C. can be arrived and oxygen is removed with nitrogen gas flashing. Then an aqueous solution of 0.015~0.05 portions potassium persulfate in 30-50 portions deionized water is added into the reactor with purging nitrogen. The reaction system is held for 0~8 hours after gelation. Then, the products are obtained after the gel is dried, granulated and screened.

It is found that when mixed with water or brine, the viscoelastic particles of the oil displacement agent are not dissolved completely and the produced mixture is a heterogeneous aqueous solution. The solution of oil displacement agent can increase elastic modulus without decreasing viscosity and possesses striking anti-ageing property under circumstances of high temperature and high salinity for long term of thirty days and even three months.

Advantages of the invention are as follows:

The present invention provides novel viscoelastic particle displacement agents, as partly crosslinked and partly branched PAM, which combine advantages of both crosslinked PAM and linear PAM, namely, in possession of properties of both completely crosslinked gel and linear polymer solution. Further, on the one hand, the present invention has overcome deficiencies of crosslinked particles of low viscosity, obvious particles sedimentation and poor property in transporting pore throat. On the other hand, the novel displacement agents has conquered the weakness of linear PAM in anti-shearing, heat-resistance and salt tolerance. The partly crosslinked structure of the agents endows with its excellence in heat-resistance, elastic deformation and anti-shearing strength, while its partly branched structure feature contributes to the high viscosity and suspension properties, and therefore, the synthesized copolymer of the present invention can act as oil displacement agent with potent control capability in a heterogeneous oil reservoir.

DETAILED DESCRIPTION

Figure 1:
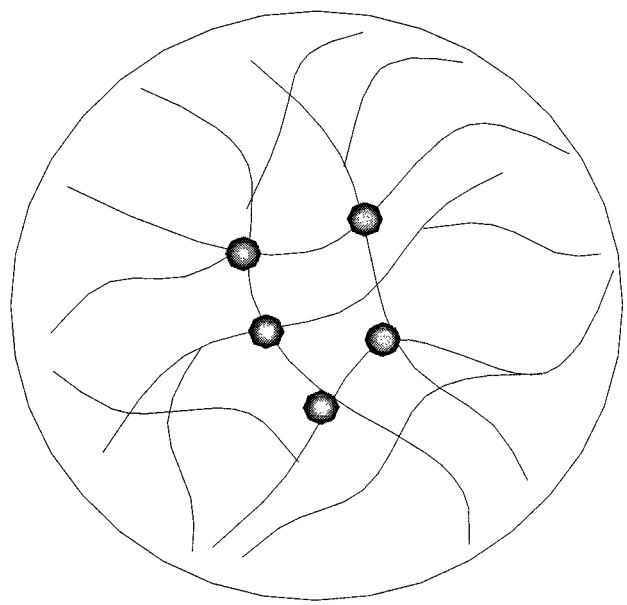
FIG. 1 shows a schematic structure of the viscoelastic particle oil displacement agent of the present invention.

The structural feature of the oil displacement agent of the present invention:

The oil displacement agent of the present invention is characterized by a partly crosslinked and partly branched structure, as shown in FIG. 1. Such a partly crosslinked and partly branched structure is formed by aqueous copolymerizing acrylamide and N,N-dimethylaminoethyl methacrylate (DMAEMA), in the presence of a redox initiator system.

DMAEMA monomer, which has three functionality, copolymerizes with AM when initiated by free radical, and DMAEMA enters into main chain; then DMAEMA reacts with oxidant, losing a hydrogen atom of —$CH_2$ adjacent to N atom and forming a free radical, and the free radical herein can initiate polymerization creating branch chains. These branch chains may further react to form crosslinked structure by coupling termination of free radicals at the chain end. Because of auto-acceleration effect of free radical polymerization, coupling termination is diffusion controlled. Kinetic factors derived from the rapid increase of viscosity in the reaction procedure inhibit coupling termination. Consequently, mass branch chains are formed. But we still have found partly crosslinked structure existing and further researches prove that the content of crosslinked gel in polymer accounts for 30%-40%.

Figure 13:
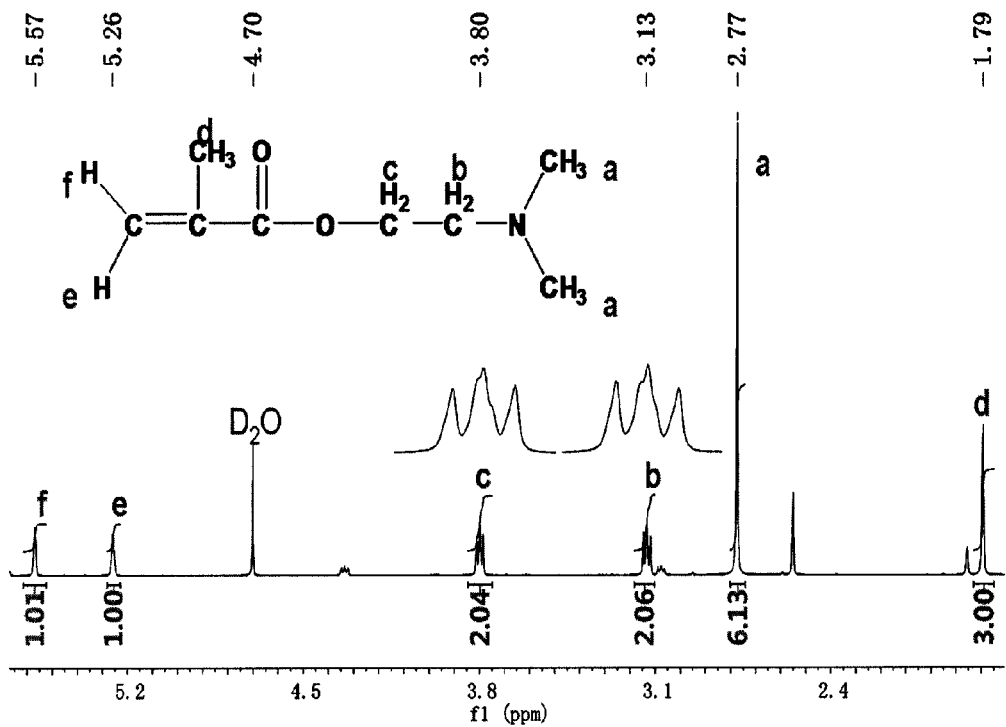
FIG. 13 is a $^1$H NMR spectrum of DMAEMA.
Figure 14:
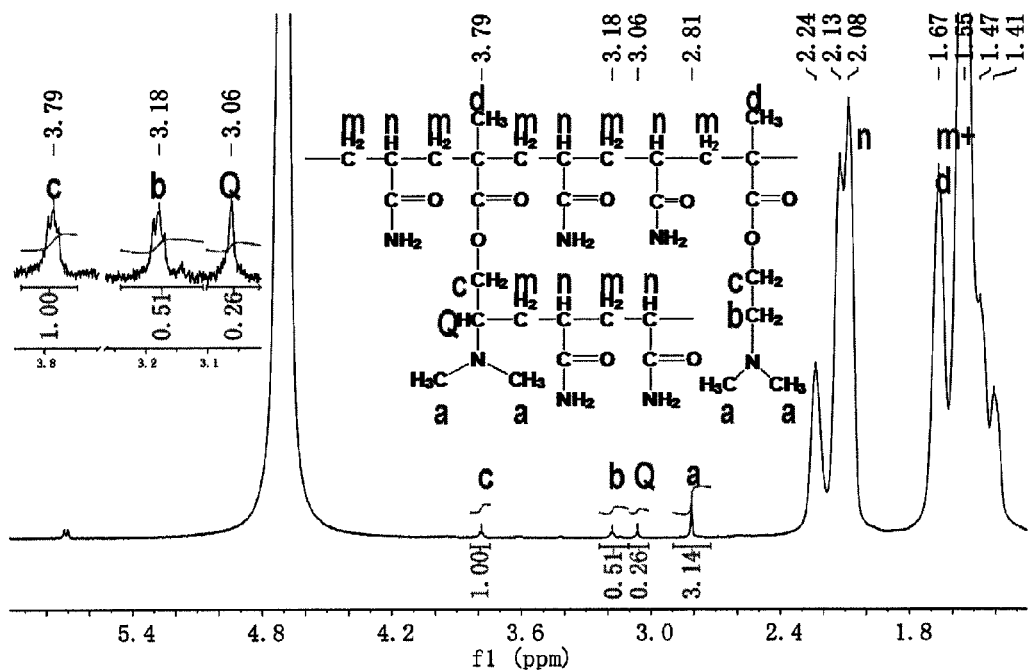
FIG. 14 is a $^1$H NMR spectrum of oil displacement agent prepared in Example 2.

The partly crosslinked structure of the invention is proved by $^1$H NMR. FIG. 13 is the $^1$H NMR spectrum of the functional monomer DMAEMA. FIG. 14 is the $^1$H NMR spectrum of the copolymer produced by the example 2. FIG. 13 shows the chemical shifts of hydrogen atoms on DMAEMA at positions a, b, c, d, e, and f, which are at 2.77, 3.13, 3.80, 1.79, 5.26 and 5.57 ppm, respectively. The integral area ratio of the resonance peaks is about 6:2:2:3:1:1, in accordance with the number ratio of the hydrogen atoms, respectively. FIG. 14 shows that resonances of the alternate methylene (m) and methyne (n) are at the chemical shift of 1.5 and 2.1 ppm, respectively. The chemical shift at 3.18 ppm is attributing to hydrogen of methylene (b) adjacent to N atom on DMAEMA, which has not reacted with the oxidant. After the reaction, the methylene (b) lost a hydrogen atom and become to a methyne (Q). Because of the shielding effect of the methylene on the branch chains to the hydrogen atom at Q, the chemical shift of the hydrogen atom at Q moves to low field, and the resonance appears at 3.06 ppm. The integral area ratio of c and (b+Q) resonance peaks is 1:0.77, less than 1, also proving that the methylene at position (b) on DMAEMA is oxidized to a methyne, and forms a branch point at there. Then, when the biradical termination occurs among large amount of radicals, the partly crosslinked structure is formed due to the coupling termination.

Properties of the Oil Displacement Agent of the Present Invention:

Conditions for Testing and Characterization

1. Rheological Measurement

The viscoelastic properties of 1 wt % sample (in terms of solid content of oil displacement agent) in salt solution with the mineralization of 19334-30000 mg/L are investigated by Oscillation rheometer (Bohlin Gemini200, Malvern instruments Ltd.).

And the test conditions are as follows: shear stress 0.1 Pa, gap 1000 μm, 40 mm diameter parallel plates, temperature 70° C. Detailed results are shown in FIGS. 2, 3, 4, 5, 6, 7, 10.

2. Seepage Flow Experiment

The seepage flow performances of 0.2 wt % sample (in terms of solid content of oil displacement agent) in salt solution with the mineralization of 19334 mg/L are tested by sand pack Experiment.

Figure 8:
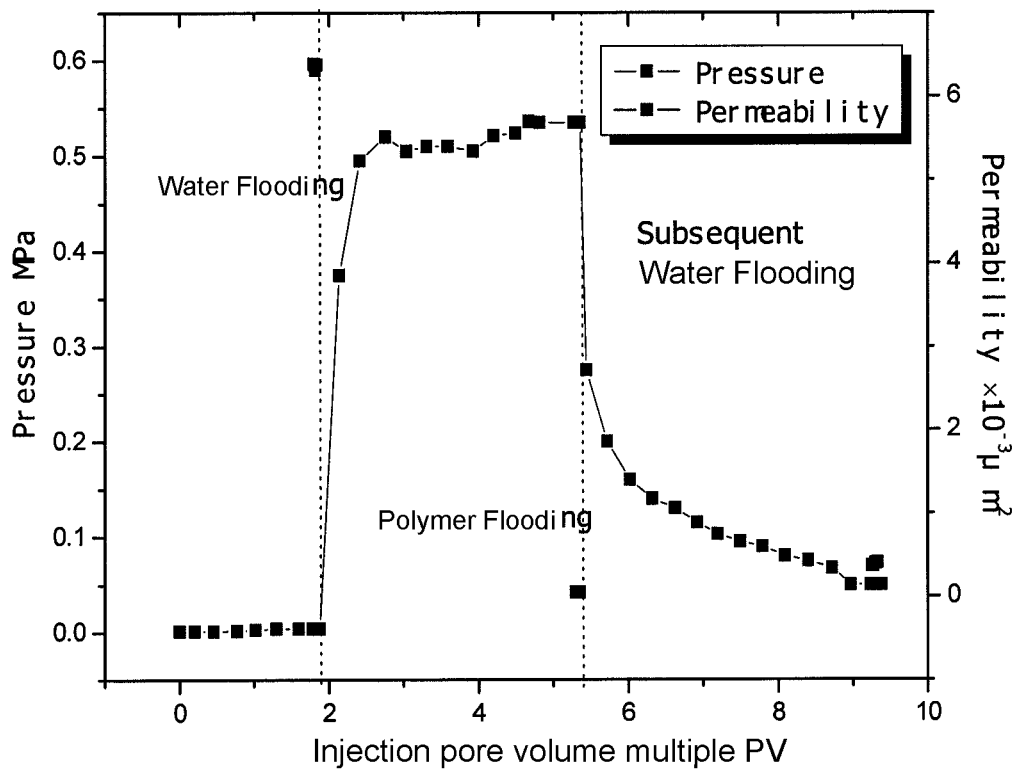
FIG. 8 is the seepage flow curve of a solution of oil displacement agent prepared in Example 4, at 75° C., in the sand pack (1500 mD) and the mineralization of the salt solution is 19334 mg/L.
Figure 9:
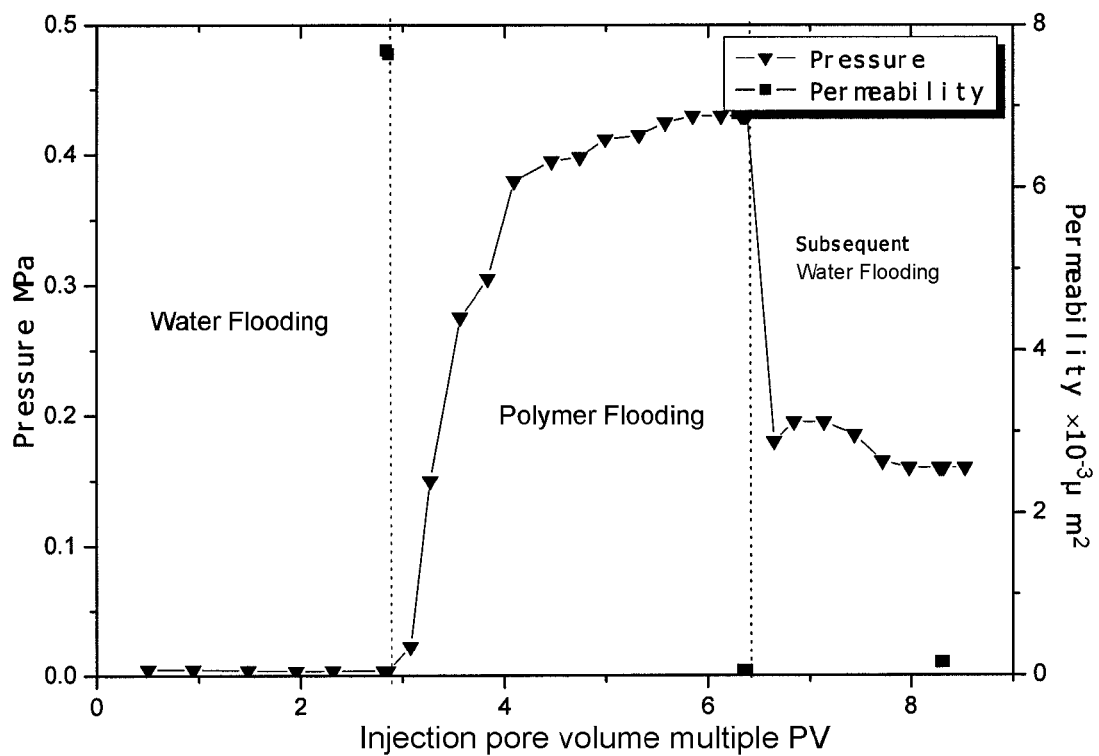
FIG. 9 is the seepage flow curve of a solution of oil displacement agent prepared in a pilotscale experiment of Example 4, at 75° C., in the sand pack (1500 mD), and the mineralization of the salt solution is 19334 mg/L.

The test conditions are as follows: permeability of sand pack 1500 mD, temperature 75° C., flow rate 0.5 mL/min. Detailed results are shown in FIGS. 8, 9.

3. Apparent Viscosity Measurement

The apparent viscosities of 1 wt % and 0.5 wt % samples (in terms of solid content of oil displacement agent) in salt solution with different mineralization are measured with the rotation viscosimeter (NDJ-9S, Shanghai balance instrument plant, China), respectively. Detailed results are shown in Tables 1, 2.

4. Suspension Performance Measurement

The suspension volume of viscoelastic particles of oil displacement agent in salt solution is tested by size exclusion method.

Detailed results are shown in Table 1.

5. Ageing Test 1 wt % and 0.5 wt % samples (in terms of solid content of oil displacement agent) in salt solution with different mineralization are put into a 85° C. oven for a long term ageing test. Then viscosity of aged sample was measured with the rotation viscosimeter.

Detailed results are shown in Tables 3, 4.

Figure 2:
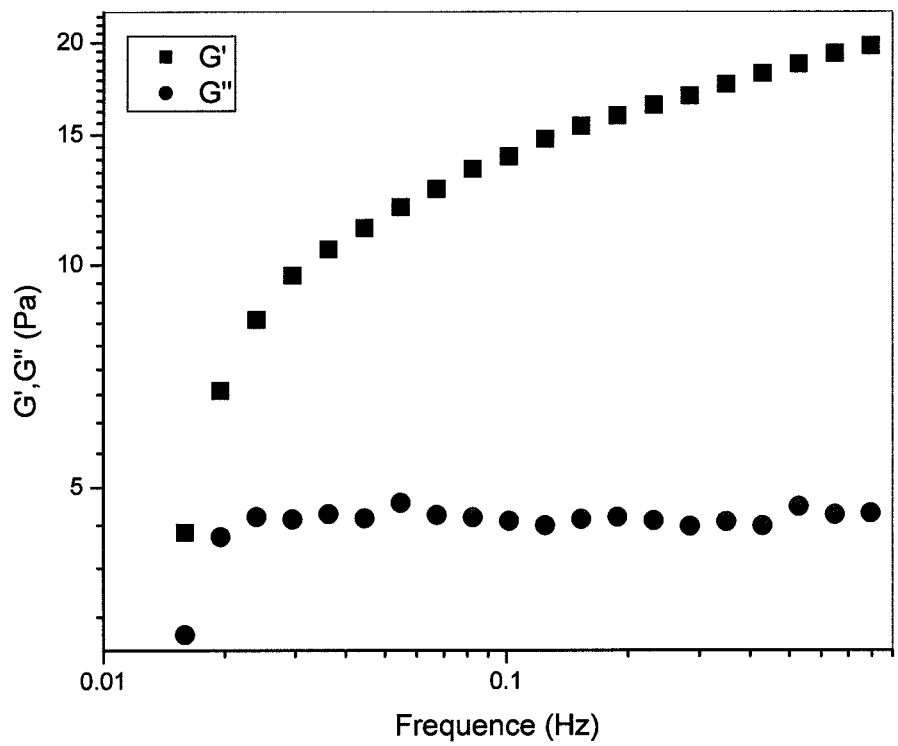
FIG. 2 shows the effect of frequency on storage modulus (G') and loss modulus (G") of oil displacement agent sample prepared in Example 1 in salt solution with 19334 mg/L mineralization.

FIG. 2 shows the effect of frequency on storage modulus (G') and loss modulus (G") of an oil displacement agent sample of present invention in salt solution with 19334 mg/L mineralization. As seen from FIG. 2, the sample solution exhibits high modulus and G', G" can reach 14 Pa, 4.5 Pa at 0.1 Hz, respectively.

Figure 3:
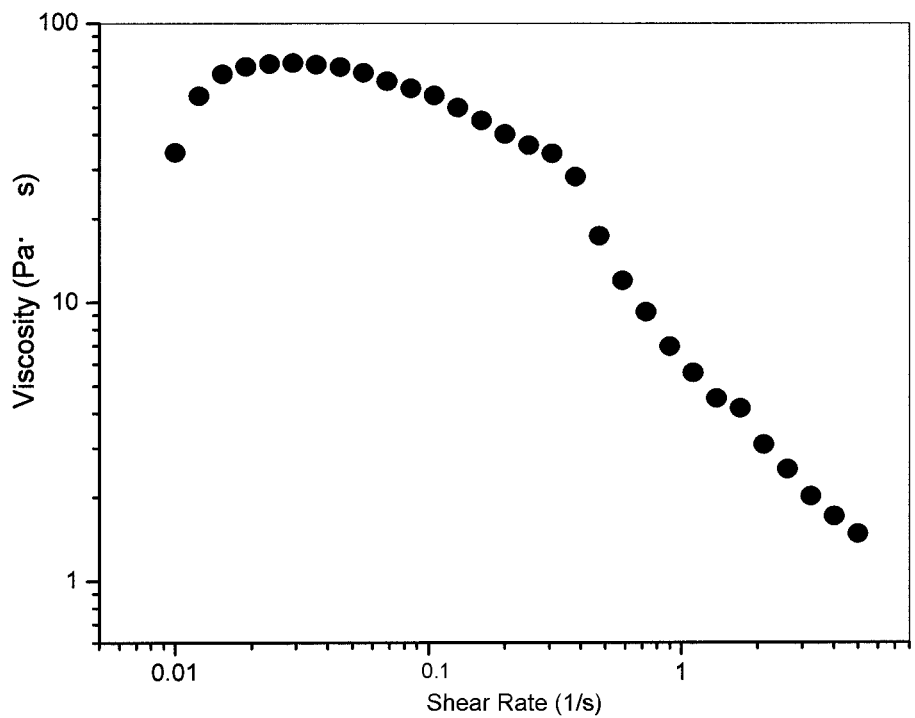
FIG. 3 shows the effect of shear rate on viscosity of oil displacement agent sample prepared in Example 1 in salt solution with 19334 mg/L mineralization.

FIG. 3 shows the effect of shear rate on viscosity of the above sample in salt solution with 19334 mg/L mineralization. As seen from FIG. 3, the polymer solution has high viscosity which can reach 56 Pa·S under the shear rate of 0.1 1/S. There is a wide plateau as shear rate increases and with further increase of shear rate, the viscosity decreases slowly, indicating that the solution has good salt tolerance and anti-shearing property.

Figure 4:
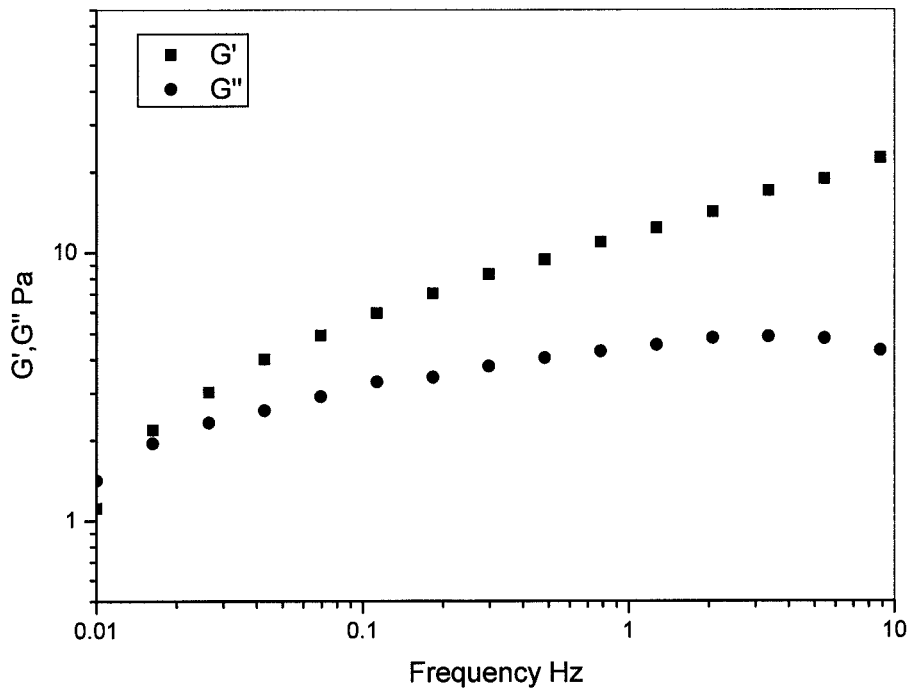
FIG. 4 shows the effect of frequency on G' and G" of oil displacement agent prepared in Example 2 in salt solution with 19334 mg/L mineralization and FIG. 5 shows the effect of shear rate on viscosity of the polymer solution.
Figure 5:
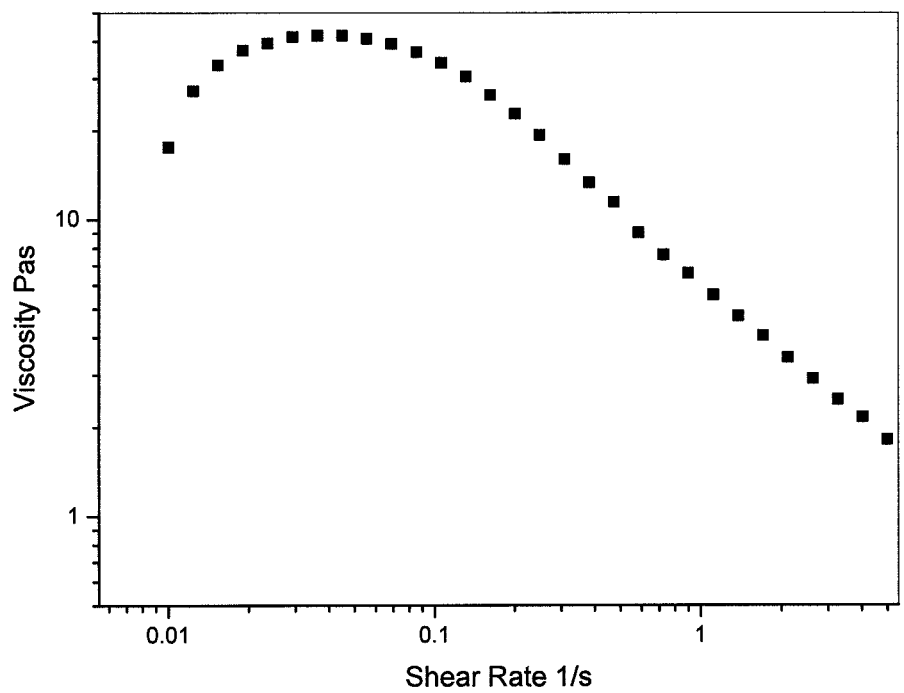

FIG. 4 shows the effect of frequency on G' and G" of another oil displacement agent sample of present invention in salt solution and FIG. 5 shows the effect of shear rate on viscosity of the polymer solution. As seen from these figures, the polymer solution exhibits excellent rheological properties with high modulus and G', G" can reach 5.8 Pa, 3 Pa at 0.1 Hz, respectively. The polymer solution also has a high viscosity which can reach 34 Pa·S at the shear rate of 0.1 1/S. At low shear rate stage, viscosity increases with the growth of shear rate and then there is a wide plateau. With further increase of shear rate, the viscosity decreases slowly, indicating that the solution has good salt tolerance and anti-shearing property.

Figure 6:
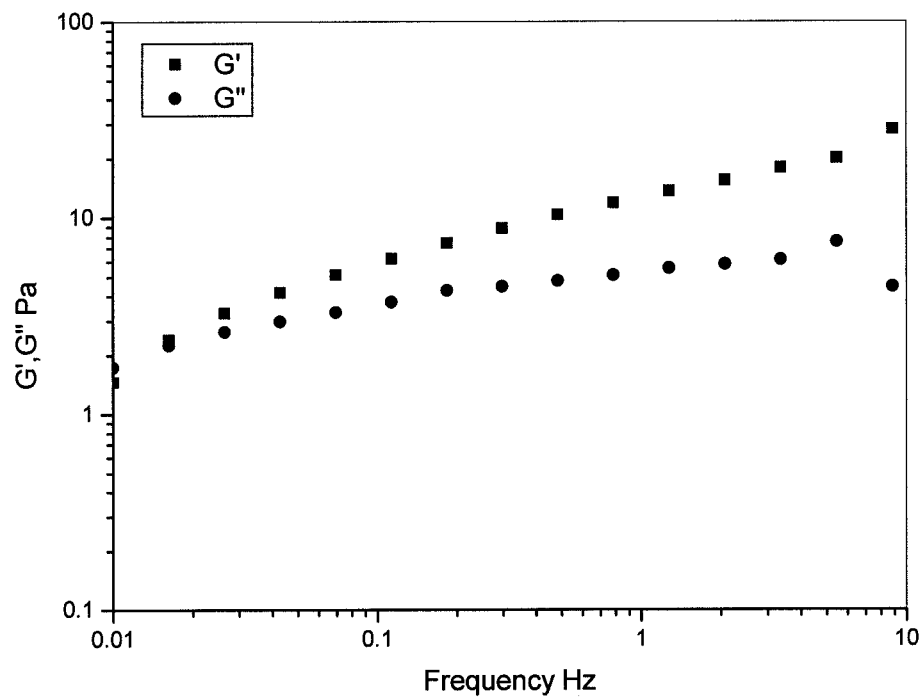
FIG. 6 shows the effect of frequency on G' and G" of oil displacement agent prepared in Example 3 in salt solution with 19334 mg/L mineralization and FIG. 7 shows the effect of shear rate on viscosity of the polymer solution.
Figure 7:
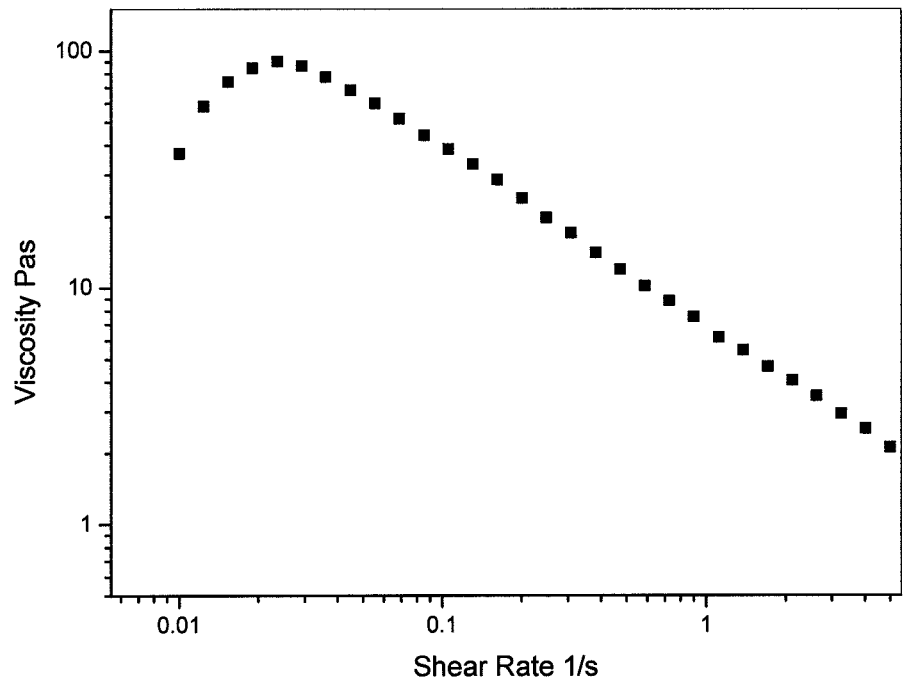

FIG. 6 shows the effect of frequency on G' and G" of still another oil displacement agent sample of present invention in salt solution and FIG. 7 is the effect of shear rate on viscosity of the polymer solution. As seen from these figures, G', G" can reach 6.1 Pa, 3.8 Pa at 0.1 Hz, respectively. The polymer solution also has a high viscosity which can reach 39.3 Pa·S under the shear rate of 0.1 1/S. At low shear rate stage, viscosity increases with the growth of shear rate and then with further increase of shear rate, the viscosity decreases slowly, indicating that the solution has good salt tolerance and anti-shearing property.

FIG. 8 is the seepage flow curve of Z1 polymer solution at 75° C. in the sand pack (1500 mD), and FIG. 9 is the seepage flow curve of G7 polymer solution at 75° C. in the sand pack (1500 mD). FIGS. 8, 9 indicate that viscoelastic particle displacement agent solution has good seepage flow property with a high pressure plateau and the maximum pressure of sample Z1 and G7 can reach 0.535 MPa and 0.43 MPa, respectively. FIGS. 8, 9 also indicate that resistance factor (RF) and residual resistance factor (RRF) of the viscoelastic particles are high. RF, RRF of Z1 is 130.3, 14.3, respectively and RF, RRF of G7 is 126.1, 46.8, respectively. The results above suggest that viscoelastic particle displacement agent solution has good transport ability, seepage flow property and boosting capability in the sand pack tube.

Figure 11:
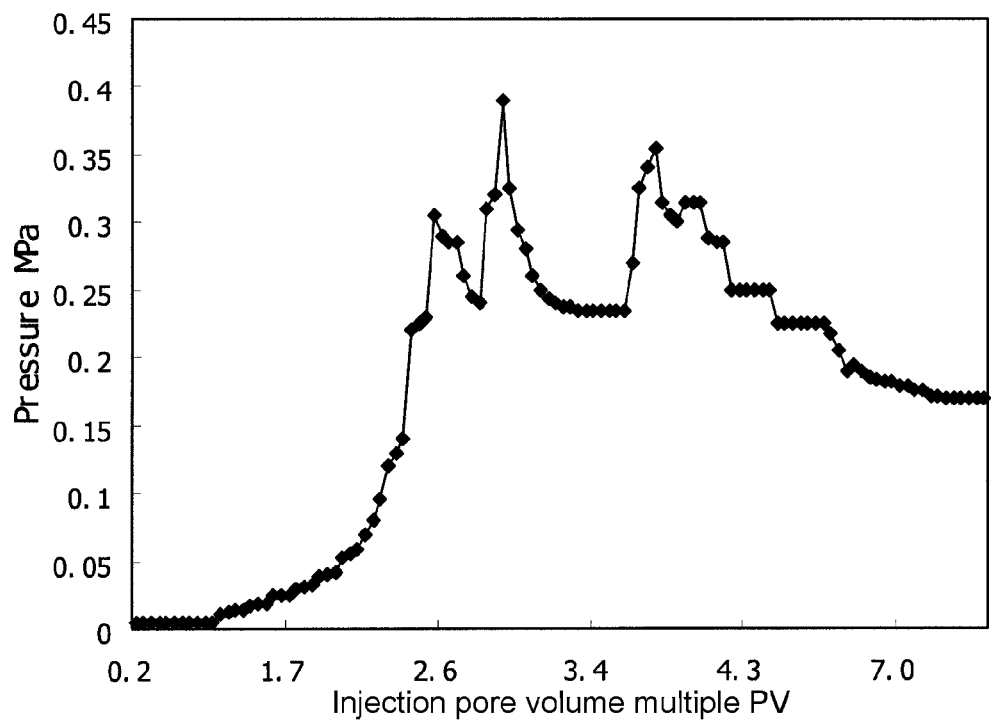
FIG. 11 is the seepage flow curve of a solution of oil displacement agent prepared in Example 2, at 75° C., in the sand pack (1500 mD), and the mineralization of the salt solution is 19334 mg/L.
Figure 12:
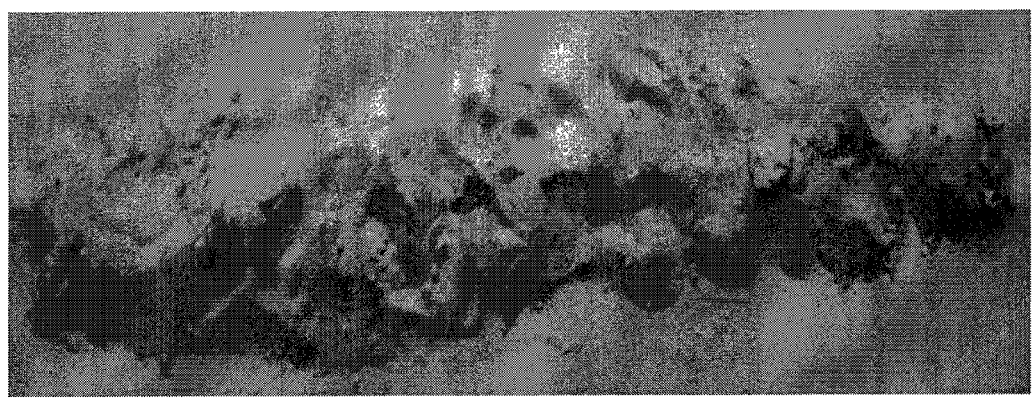
FIG. 12 is a photograph showing the sand particles after the seepage flow experiment of the oil displacement agent prepared in Example 2.

FIG. 11 is the seepage flow curve of F29 oil displacement agent solution, and FIG. 12 is a photograph showing the sand particles after the seepage flow experiment of F29 oil displacement agent. As seen from these figures, after the subsequent water flooding, the sand particles are incompact, without obvious blocks, indicating a good transport ability of the solution in the sand pack mode. In addition, the pressure drop of the subsequent water flooding is not obvious, indicating that the solution has a good heterogeneous control capability and a good plugging capacity to high permeability layer.

Figure 15:
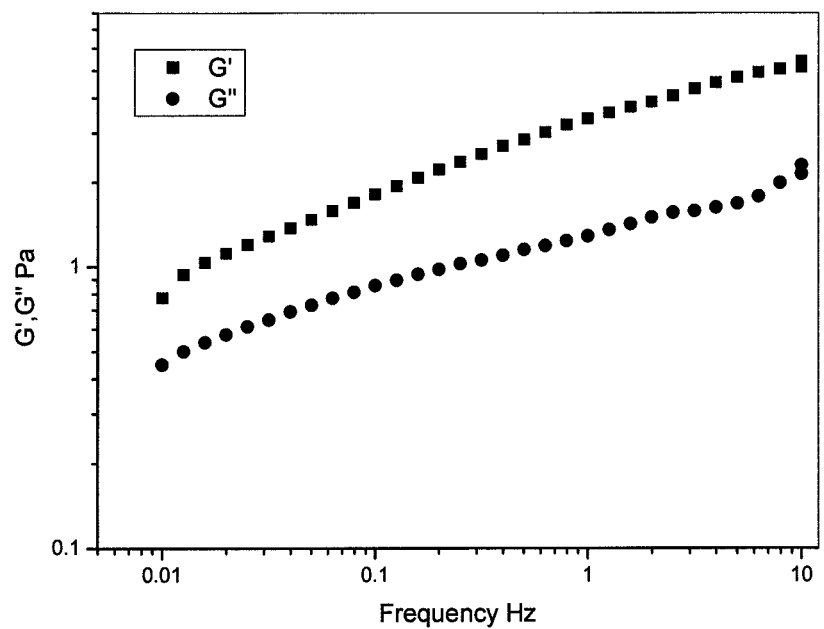
FIG. 15 shows the effect of frequency on G' and G" of oil displacement agent prepared in Example 4 in salt solution with 19334 mg/L mineralization and FIG. 16 shows the effect of shear rate on viscosity of the polymer solution.
Figure 16:
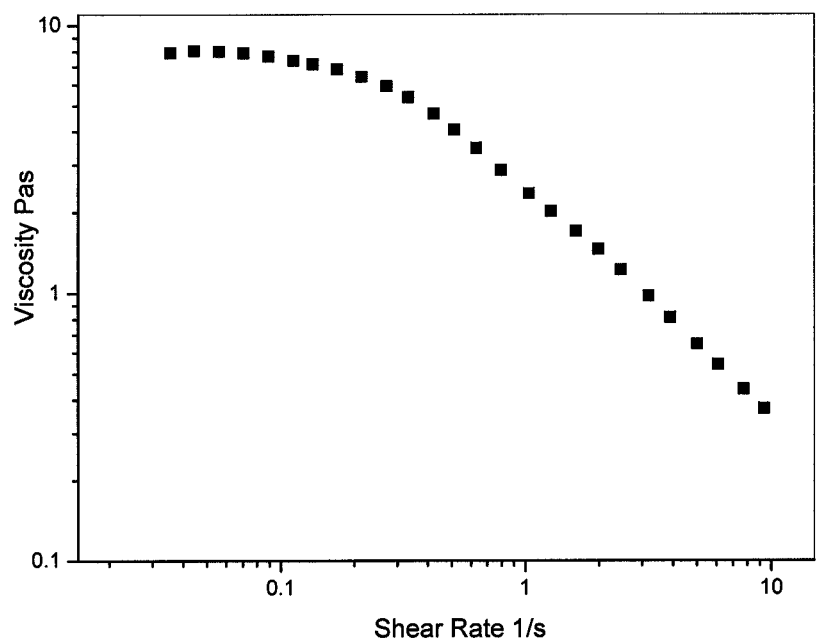

FIG. 15 shows the effect of frequency on G' and G" of another oil displacement agent sample of present invention in salt solution and FIG. 16 shows the effect of shear rate on viscosity of the polymer solution. As seen from these figures, the polymer solution exhibits excellent rheological properties with high modulus and G', G" can reach 1.85 Pa, 0.87 Pa at 0.1 Hz, respectively. The polymer solution also has a high viscosity which reaches 8.3 Pa·S at the shear rate of 0.1 1/S. At low shear rate stage, viscosity increases with the growth of shear rate and then there is a wide plateau. With further increase of shear rate, the viscosity decreases slowly, indicating that the solution has good salt tolerance and anti-shearing property.

Table 1 shows the viscosity and suspension volume of 1 wt % and 0.5 wt % viscoelastic particle displacement agent solution and those of completely crosslinked PAM particles in salt solution with 30000 mg/L mineralization. The result indicates that, compared with completely crosslinked PAM system, the displacement agent salt solution of present invention has increased viscosity and improved suspension property.

Table 2 shows the viscosity of 0.5 wt % oil displacement agent of present invention in salt solution with different mineralization. The result shows that the viscosity of the polymer solution increases with salt ion concentration increasing, displaying good salt tolerance property of the displacement agent.

Table 3 shows the viscosity of 0.5 wt % oil displacement agent of present invention and 0.5 wt % HPAM in salt solution with different mineralization under ageing test at 85° C. for thirty days. No. 1, 2, 3 are salt solutions of partly crosslinked oil displacement agents synthesized by the process of the present invention and No. 4 is salt solution of HPAM. Results show that, HPAM solution has a relatively high initial viscosity; but after ageing test in brine with different mineralization for 30 days, the viscosity of HPAM solution is lower than that of the partly crosslinked oil displacement agents solution, which indicates that, due to its particular ageing mechanism, the partly crosslinked oil displacement agents solution exhibit excellent anti-ageing property under the condition of high temperature and high salinity.

Table 4 shows the viscosity of 1 wt % oil displacement agent of the present invention in salt solution with mineralization of 19334 mg/L and 30000 mg/L after ageing test at 85° C. for 3 months. The result indicates that the oil displacement agent solution of the present invention has outstanding anti-ageing property under the condition of high temperature and high salinity. After ageing test for 3 months, viscosity retention rate of the best sample is more than 100%, which is much more than that of HPAM under same condition shown in Table 3.

EXAMPLES

The following examples are provided to further illustrate the present invention, and they are not intended to limit the scope of the present invention. Those skilled in this field can make some nonessential improvements and adjustments based on the disclosures of the present invention. Amounts are in weight parts or weight percentages unless otherwise indicated.

Example 1

100 portions acrylamide, 0.5 portions DMAEMA and 0.05 portions sodium bisulfite were dissolved in 180, 40, 50 portions deionized water, respectively. Then they were successively added to a polymerizer equipped with a thermosopic bar, a nitrogen gas inlet/outlet and a jacket by which reaction temperature of 30° C. can be arrived and oxygen is removed with nitrogen gas flashing. Then an aqueous solution of 0.05 portions potassium persulfate in 50 portions deionized water was added into the reactor with purging nitrogen. The reaction system was held for hours after gelation. Then, the products were obtained after the gel was dried, granulated and screened.

Property Tests:

The rheological properties of the viscoelastic particle displacement agent, synthesized according to Example 1, in salt solution are shown in FIGS. 2, 3. Results show that the polymer solution has excellent rheological properties. Its G', G" are high and can reach 14 Pa, 4.5 Pa at 0.1 Hz, respectively. Besides, the viscosity of the polymer solution is also high, which reaches 56 Pa·S under the shear rate of 0.1 1/S. As the shear rate increases there is a wide plateau; and as the shear rate further increased, the viscosity decreases slowly, indicating that the solution has good anti-shearing strength and salt tolerance property.

The apparent viscosity and suspension properties of the viscoelastic particle displacement agent, synthesized according to Example 1, in salt solution, are shown in No 1 in Table 1. The results show that the polymer solution has high apparent viscosity, and when the concentration is 1 wt % and 0.5 wt %, the apparent viscosity is 1.3 Pa·S and 0.35 Pa·S, respectively. Also, the polymer solution has good suspension performance, and when the concentration is 1 wt %, there is no obvious particle sedimentation; and when the concentration is 0.5 wt %, suspension volume becomes more than 90% after standing for 2 hours in salt solution.

Example 2

100 portions acrylamide, 0.35 portions DMAEMA and 0.04 portions sodium bisulfite were dissolved in 150, 30, 30 portions deionized water, respectively. Then they were successively added to a polymerizer equipped with a thermosopic bar, a nitrogen gas inlet/outlet and a jacket by which reaction temperature of 25~30° C. can be arrived and oxygen is removed with nitrogen gas flashing. Then an aqueous solution of 0.04 portions potassium persulfate in 20 portions deionized water was added into the reactor with purging nitrogen. The reaction system was held for hours after gelation. Then, the products were obtained after the gel was dried, granulated and screened.

Property Test:

The rheological properties of the viscoelastic particle displacement agent, synthesized according to Example 2, in salt solution are shown in FIGS. 4, 5. Results show that the polymer solution exhibits excellent rheological properties. Its G', G" are high and can reach 5.8 Pa, 3 Pa at 0.1 Hz, respectively. The results also show that the polymer solution also has high viscosity which reaches 34 Pa·S under the shear rate of 0.1 1/S. At low shear rate stage, viscosity increases with the growth of shear rate; as the shear rate further increases there is a wide plateau; and then with still further increase of shear rate, the viscosity decreases slowly, indicating that the solution has good salt tolerance and anti-shearing property.

The apparent viscosity and suspension properties of the viscoelastic particle displacement agent, synthesized according to Example 2, in salt solution are shown in No 2 in Table 1. The results show that the polymer solution has high apparent viscosity, and when the concentration is 1 wt % and 0.5 wt %, the apparent viscosity is 2.3 Pa·S and 0.45 Pa·S, respectively. Also, the polymer solution has good suspension performance, and when the concentration is 1 wt %, there is no obvious particle sedimentation; and when the concentration is 0.5 wt %, suspension volume becomes more than 90% after standing for 2 hours in salt solution.

Example 3

100 portions acrylamide, 0.3 portions DMAEMA and 0.03 portions sodium bisulfite were dissolved in 180, 40, 50 portions deionized water, respectively. Then they were successively added to a polymerizer equipped with a thermosopic bar, a nitrogen gas inlet/outlet and a jacket by which reaction temperature of 25~30° C. can be arrived and oxygen is removed with nitrogen gas flashing. Then an aqueous solution of 0.03 portions potassium persulfate in 50 portions deionized water was added into the reactor with purging nitrogen. The reaction system was held for hours after gelation. Then, the products were obtained after the gel was dried, granulated and screened.

Property Test:

The rheological properties of the viscoelastic particle displacement agent, synthesized according to Example 3, in salt solution, are shown in FIGS. 6, 7. Results show that the polymer solution exhibits excellent rheological properties. Its G', G" are high and can reach 6.1 Pa, 3.8 Pa at 0.1 Hz, respectively. The results also show that the polymer solution also has high viscosity which reaches 39.3 Pa·S under the shear rate of 0.1 1/S. At low shear rate stage, viscosity increases with the growth of shear rate; and then with further increase of shear rate, the viscosity decreases slowly, indicating that the solution has good salt tolerance and anti-shearing property.

The apparent viscosity and suspension properties of the viscoelastic particle displacement agent, synthesized according to Example 3, in salt solution are shown in No 3 in Table 1. The results show that the polymer solution has high apparent viscosity, and when the concentration is 1 wt % and 0.5 wt %, the apparent viscosity is 2.5 Pa·S and 0.38 Pa·S, respectively. Also, the polymer solution has good suspension performance, and when the concentration is 1 wt %, suspension volume becomes more than 90% after standing for 2 hours in salt solution; and when the concentration is 0.5 wt %, suspension volume becomes more than 85% after standing for 2 hours in salt solution.

Example 4

100 portions acrylamide, 0.175 portions DMAEMA and 0.013 portions sodium bisulfite were dissolved in 180, 40, 50 portions deionized water, respectively. Then they were successively added to a polymerizer equipped with a thermosopic bar, a nitrogen gas inlet/outlet and a jacket by which reaction temperature of 10° C. can be arrived and oxygen is removed with nitrogen gas flashing. Then an aqueous solution of 0.016 portions potassium persulfate in 50 portions deionized water was added into the reactor with purging nitrogen. The reaction system was held for hours after gelation. Then, the products were obtained after the gel was dried, granulated and screened.

Property Test:

The rheological properties of the viscoelastic particle displacement agent, synthesized according to Example 4, in salt solution are shown in FIGS. 15 and 16. Results show that the polymer solution exhibits excellent rheological properties. Its G', G" are high and can reach 1.85 Pa, 0.87 Pa at 0.1 Hz, respectively. And the polymer solution has good suspension performance, and when the concentration is 0.5 wt %, suspension volume becomes more than 98% after standing for 2 hours in salt solution. The polymer solution also has high viscosity and salt tolerance property, and the viscosity reaches 8.3 Pa·S under the shear rate of 0.1 1/S. At low shear rate stage, there is a wide plateau; and then with further increase of shear rate, the viscosity decreases slowly, indicating that the solution has good salt tolerance and anti-shearing property.

Comparison Example 1

Figure 10:
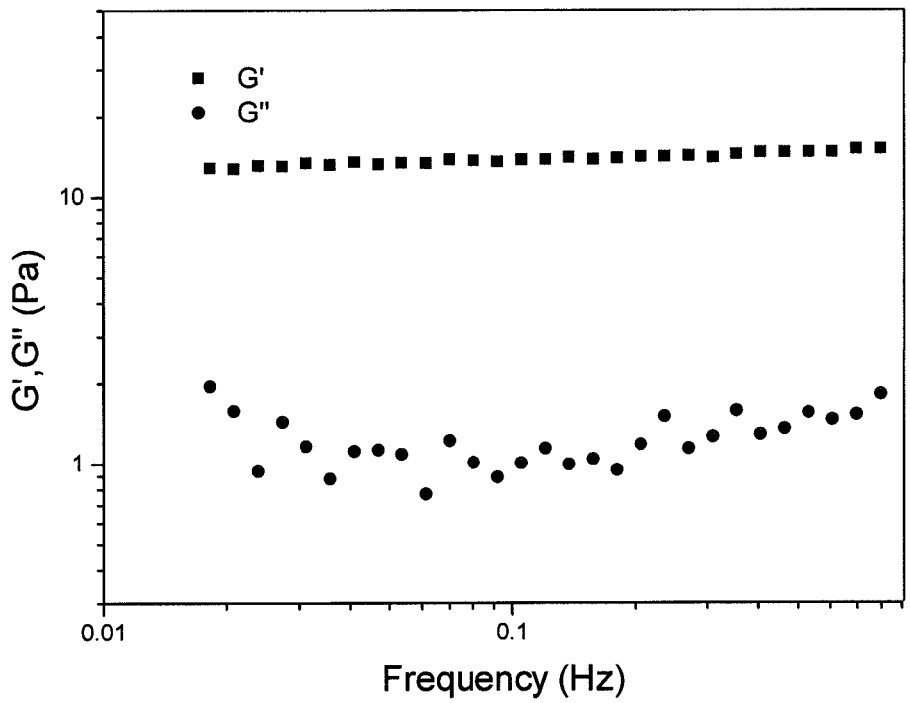
FIG. 10 shows the rheological properties of completely crosslinked PAM used as water shutoff agent in EOR.

FIG. 10 is the rheological properties of completely crosslinked PAM solution used as water shutoff agent in Enhanced Oil Recovery (EOR). Its apparent viscosity and suspension properties are shown in No 4 in Table 1. It can be seen that G' of crosslinked PAM is high and G" is low. At the frequency of 0.1 Hz, G' is 10 Pa and G" is only 1 Pa. From the poor rheological properties, it can be concluded that completely crosslinked PAM is not proper to be used as displacement agent because of its poor transport ability and low residual resistance factor in the core pores. Meanwhile, completely crosslinked PAM solution cannot effectively enlarge swept volume and improve mobility ratio of oil to water due to its low viscosity and obvious particle sedimentation.

Comparison Example 2

Table 3 shows the ageing test results of the viscoelastic particle displacement agent synthesized according to the present invention and HPAM in salt solutions with different mineralization at 85° C. Results of comparison are as follows. After ageing test for 30 days, the apparent viscosity retention rates of HPAM in salt solution with mineralization of 19334 mg/L, 30000 mg/L, 50000 mg/L are 67%, 29%, 57%, respectively. However, apparent viscosity retention rate of No. 2 viscoelastic particle displacement agent solution is 368%, 125%, 184% and that of No. 3 viscoelastic particle displacement agent solution is 267%, 271%, 333%. Although the initial apparent viscosity of HPAM solution is high, it decreases obviously after ageing test under high temperature and high salinity for 30 days. The apparent viscosity of viscoelastic particle displacement agent solution is higher than that of HPAM solution after ageing for 30 days. Furthermore, comparing the results of 3 months ageing test in table 4, we find that the viscosity of viscoelastic particle displacement agent solution after 3 months ageing test is also much larger than that of HPAM solution after 30 days ageing test. Thus it can be concluded that the anti-ageing property of viscoelastic particle displacement agent solution is superior to that of HPAM solution under a circumstance of long-term high temperature and high salinity. And therefore, viscoelastic particle displacement agent of polyacrylamide synthesized according to the present invention should have a longer service life in practical than HPAM.

TABLE 1

(mineralization 30000 mg/L, 1 wt %)

| | 1% | | 0.5% | |
|---|---|---|---|---|
| NO. | apparent viscosity Pa·S | suspension volume % | apparent viscosity Pa·S | suspension volume % |
| 1# | 1.36 | 100 | 0.3 | 90 |
| 2# | 2.23 | 100 | 0.45 | 90 |
| 3# | 2.51 | 90 | 0.38 | 85 |
| 4# | 0.03 | 35 | 0.03 | 68 |

TABLE 2

(0.5 wt %)

| mineralization mg/L | $\eta$ Pa·S |
|---|---|
| 0 | 0.274 |
| 19334 | 0.317 |
| 30000 | 0.325 |
| 50000 | 0.334 |

TABLE 3

(0.5 wt %, 85° C. ageing test)

| | 19334 mg/L | | | 30000 mg/L | | | 50000 mg/L | | |
|---|---|---|---|---|---|---|---|---|---|
| | 0 day Pa·S | 30 days Pa·S | $\eta_{30}/\eta_0$ % | 0 day Pa·S | 30 days Pa·S | $\eta_{30}/\eta_0$ % | 0 day Pa·S | 30 days Pa·S | $\eta_{30}/\eta_0$ % |
| 1# | 0.423 | 0.527 | 124 | 0.574 | 0.454 | 79 | 0.608 | 0.483 | 79 |
| 2# | 0.202 | 0.743 | 368 | 0.478 | 0.601 | 125 | 0.228 | 0.421 | 184 |
| 3# | 0.199 | 0.532 | 267 | 0.162 | 0.441 | 271 | 0.14 | 0.485 | 333 |
| 4# | 0.736 | 0.500 | 67 | 0.767 | 0.225 | 29 | 0.661 | 0.382 | 57 |

TABLE 4

(1 wt %, 85° C. ageing test)

| | 19334 mg/L | | | 30000 mg/L | | |
|---|---|---|---|---|---|---|
| | $\eta_0$ Pa·S 0 month | $\eta_3$ Pa·S 3 months | $\eta_3/\eta_0$ % | $\eta_0$ Pa·S 0 month | $\eta_3$ Pa·S 3 months | $\eta_3/\eta_0$ % |
| 1# | 0.455 | 0.294 | 64.68 | 1.044 | 0.392 | 37% |
| 2# | 1.725 | 0.532 | 30.87 | 1.813 | 0.576 | 31.7% |
| 3# | 0.625 | 0.423 | 67.60 | 1.222 | 1.362 | 111% |
| 4# | 0.542 | 0.777 | 143.27 | 0.708 | 0.435 | 61% |

What is claimed is:

1. A process for preparing an oil displacement agent derived from a polyacrylamide-based polymer, said polyacrylamide-based polymer comprising a partly crosslinked and partly branched structure, the process comprising:
  forming an aqueous solution comprising monomers, said monomers consisting of N,N-dimethylaminoethyl methacrylate and acrylamide;
  copolymerizing said monomers in said aqueous solution, thereby obtaining the polyacrylamide-based polymer;
  wherein a content of crosslinked gel in the polyacrylamide-based polymer is from 30% to 40%;
  wherein said copolymerization is performed in an aqueous medium, under an inert gas, in the presence of a redox initiator system consisting of potassium persulfate and sodium bisulfite; and wherein a mass ratio of acrylamide to N,N-dimethylaminoethyl methacrylate is 100:0.15-1.

2. The process according to claim 1, wherein the amounts of potassium persulfate and sodium bisulfite are 0.015-0.05 parts by mass and 0.015-0.05 parts by mass, respectively, relative to 100 parts by mass of acrylamide.

3. The process according to claim 1, wherein the copolymerization reaction is carried out at a temperature from 10° C. to 30° C.

4. The process according to claim 1, wherein the inert gas is nitrogen gas.

5. The process according to claim 1, wherein the process further comprises drying and granulating a product obtained from the copolymerizing.

* * * * *